Nov. 5, 1935.  S. A. DE WALTOFF ET AL  2,019,660

DISPENSING CONTAINER

Filed June 18, 1935

Inventors
Samuel A. de Waltoff
Clarence G. Willard
Seymour Earle Nichols

Patented Nov. 5, 1935

2,019,660

UNITED STATES PATENT OFFICE 2,019,660

DISPENSING CONTAINER

Samuel A. de Waltoff, New York, N. Y., and Clarence G. Willard, New Haven, Conn.; said de Waltoff assignor to said Willard Application June 18, 1935, Serial No. 27,164

6 Claims. (Cl. 221—79)

This invention relates to improvements in dispensing containers, and more particularly to dispensing containers for dispensing cold cream and the like.

One object of this invention is to provide an improved dispensing container in compact form for cold cream and the like.

Another object of this invention is to provide an improved cover carrying compact dispensing mechanism as part thereof and adapted to be applied to a container for cold cream or the like, to dispense the latter in convenient amounts as desired.

Another object of this invention is to provide an improved dispensing container formed of simple elements readily manufactured and readily assembled to produce a compact, efficient construction.

With the above and other objects in view, this invention includes all improvements over the prior art which are disclosed in this application.

In the accompanying drawing, in which one way of carrying out the invention is shown for illustrative purposes:

Figure 1:
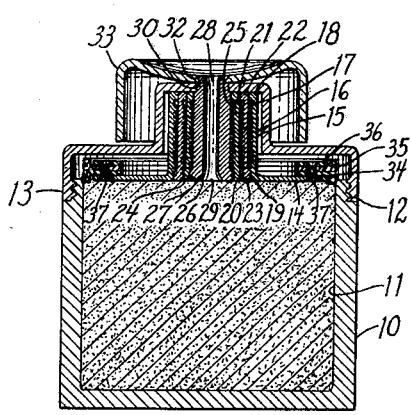
Fig. 1 is a vertical, central, sectional view illustrating one form of dispensing container made in accordance with this invention, and with the dispensing mechanism shown in completely-retired position prior to the beginning of the dispensing operation.
Figure 2:
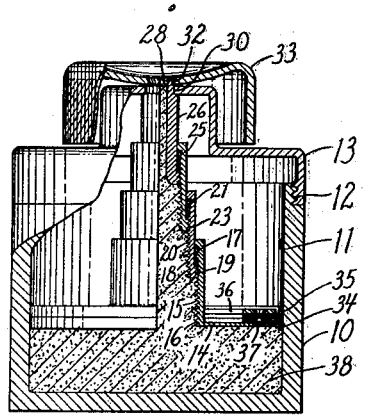
Fig. 2 is a view similar to Fig. 1, with the dispensing mechanism partly in section, partly in elevation, and partly extended in performing the dispensing operation.
Figure 3:
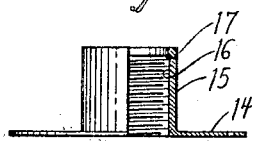
Fig. 3 is a disassembled view of the plunger and screw-sleeves or tube-sections, partly in section and partly in elevation, prior to their assembly in the device.
Figure 4:
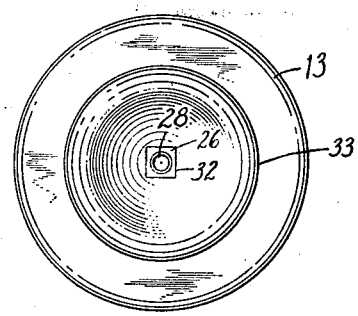
Fig. 4 is a top plan view of Fig. 1.
Figure 5:
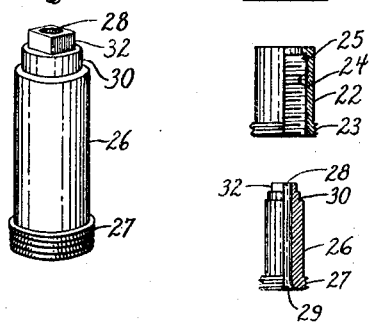
Fig. 5 is a perspective view of the smallest tube-section or sleeve.

In the description and claims, the various parts are identified by specific names for convenience, but they are intended to be as generic in their application as the prior art will permit.

Referring to the drawing, 10 is a dispensing container or jar having an open-ended cylindrical chamber 11 and a screw-thread 12 at the upper end, by which a screw-threaded cover or cap 13 can be attached to the container 10.

The plunger 14 has a tube-section 15 integral therewith or connected thereto and provided with internal screw-threads 16, and an annular limit-shoulder 17 at its upper end. The second tube-section 18 has an external screw-thread 19 at its lower end adapted to screw-threadedly fit the screw-thread 16 of the tube-section 15, and also has an internal screw-thread 20 and an upper annular limit-shoulder 21. The next smaller tube-section 22 has an external screw-thread 23 adapted to fit the internal thread 20 of the tube-section 18, and also has an internal screw-thread 24 and an upper annular limit-shoulder 25. The smallest tube-section 26 has an external screw-thread 27 adapted to fit the internal screw-thread 24 of the tube-section 22, and has a plain center-bore or hole 28 and preferably an enlarged conical opening 29 leading thereto.

The upper end of the tube-section 26 is formed with a reduced portion 30, at least the lower portion of which is annular and rotatably fits in the opening 31 in the top of the cover 13. The extreme upper end 32 of the tube-section 26 may be of any desired form, and is firmly secured to the operating-knob or flange 33, so that the tube-section 26 at all times rotates with the operating-knob 33. If desired, the connection at 32 may be made by forming the hole in the knob 33 other than round such, for example, as square, and forming the end-portion 32 and riveting it to fit in the square hole in the knob 33. Or, if the members 26 and 33 are both made of metal, they may be connected by soldering or the like.

The plunger 14 is cylindrical and slightly smaller than the inside diameter of the cylindrical opening 11 of the jar 10. In order to prevent leakage past the plunger 14 of the cold cream or material being dispensed, oppositely-directed annular packings 34 and 35, which may be made of leather or other suitable material, together with a ring 36 of metal or other suitably-rigid material, are connected to the plunger 14 in any suitable way, as by rivets 37.

The screw-threads formed on the tube-sections or sleeves 15, 18, 22 and 26 are preferably left-hand threads in order that a clockwise rotation of the operating-knob 33 will produce a down-feeding movement of the plunger 14, to feed the material to be dispensed up through the tube formed of the tube-sections, although, if desired, the threads may be made right-hand. Instead of forming the threads by cutting, they may, if desired, be formed by rolling.

It will be observed that the cover 13, together with the dispensing mechanism, constitutes a compact, separate unit which may be applied to any container o jar of suitable size. It will also be observed that inasmuch as the tube-sections are so constructed and related as to be extensible and collapsible, the dispensing mechanism can all be housed within a small space within the cover-member 13.

In operation, when the cover 13, containing the dispensing mechanism, is applied to a jar 10, as shown in Fig. 1, a rotation clockwise of the operating-knob 33 causes the tube-section 26 to rotate and, in turn, by a relative screw-threaded rotation between one or more of the tube-sections, to cause the plunger 14 to move downward, with the packing 34 engaging the cylindrical wall 11 to maintain a fluid-tight connection and force the cold cream or like material 38 up through the tube-sections and out through the opening 28, whence it can be readily removed with a finger to apply in any suitable way. The friction of the plunger 14 against the material 38 and the friction of the packing 34 with the wall 11 prevents substantial rotation of the plunger 14.

If an excessive amount of material 38 has been forced out the opening 28, or for other reasons no further use is had for the material extending out of the said opening 28, an anti-clockwise rotation of the operating-knob 33 will result in the plunger 14 rising upward and, owing to the upper packing 34 then coming into play to maintain tight sealing action against the cylindrical wall 11, a vacuum tends to be produced, which results in the external air-pressure forcing the excess material back down into the opening 28.

It will be observed that if the operating-knob 33 is turned continuously clockwise, the plunger 14 will move down its full distance or until the screw-thread 19 engages against the limit-shoulder 17 and the screw-thread 23 engages against the limit-shoulder 21 and the screw-thread 27 engages against the limit-shoulder 25. Inasmuch as the tube-sections are successively smaller, beginning with the tube-section 15 connected to the plunger 14, it will thus be plain that the resistance to the cold cream 38 passing up through the tube-sections is minimized.

The invention may be carried out in other specific ways than that herein set forth without departing from the spirit and essential characteristics of the invention, and the present embodiment is therefore to be considered in all respects as illustrative and not restrictive, and all changes coming within the meaning and equivalency range of the appended claims are intended to be embraced therein.

We claim:

1. A dispensing container construction including: a container having an open-ended cylindrical chamber; a cover for said container; a plunger adapted to fit said cylindrical chamber; an endwise extensible and collapsible tube interconnecting said plunger and said cover, with the opening of the tube extending from the bottom face of the plunger to the top face of the cover; and operating-means adapted to extend and collapse said tube.

2. A dispensing container construction including: a container having an open-ended cylindrical chamber; a cover for said container; a plunger adapted to fit said cylindrical chamber; an endwise extensible and collapsible tube formed of screw-threadedly joined tube-sections and interconnecting said plunger and said cover, with the opening of the tube extending from the bottom face of the plunger to the top face of the cover; and operating-means adapted to extend and collapse said tube.

3. A dispensing container construction including: a container having an open-ended cylindrical chamber; a cover for said container; a plunger adapted to fit said cylindrical chamber; an endwise extensible and collapsible tube formed of screw-threadedly joined, successively smaller-diametered tube-sections and interconnecting said plunger and said cover, with the opening of the tube extending from the bottom face of the plunger to the top face of the cover; and operating-means adapted to extend and collapse said tube.

4. A dispensing container construction including: a container having an open-ended cylindrical chamber; a cover for said container; a plunger adapted to fit said cylindrical chamber; an endwise extensible and collapsible tube formed of screw-threadedly joined, successively smaller-diametered tube-sections and interconnecting said plunger and said cover, with the opening of the tube extending from the bottom face of the plunger to the top face of the cover and with the largest-diametered tube-section fixedly secured to the plunger; and operating-means adapted to extend and collapse said tube.

5. A dispensing container construction including: a cover adapted to be attached to a container having an open-ended cylindrical chamber; a plunger to fit such a cylindrical chamber; an endwise extensible and collapsible tube interconnecting said plunger and said cover, with the opening of the tube extending from the bottom face of the plunger to the top face of the cover; and operating-means carried by the cover and adapted to extend and collapse said tube.

6. A dispensing container construction including: a cover adapted to be attached to a container having an open-ended cylindrical chamber; a plunger to fit such a cylindrical chamber; an endwise extensible and collapsible tube formed of screw-threadedly joined, successively smaller-diametered tube-sections and interconnecting said plunger and said cover, with the opening of the tube extending from the bottom face of the plunger to the top face of the cover and with the largest-diametered tube-section fixedly secured to the plunger; and operating-means carried by the cover and adapted to extend and collapse said tube.

SAMUEL A. DE WALTOFF.
CLARENCE G. WILLARD.